Figure 1:
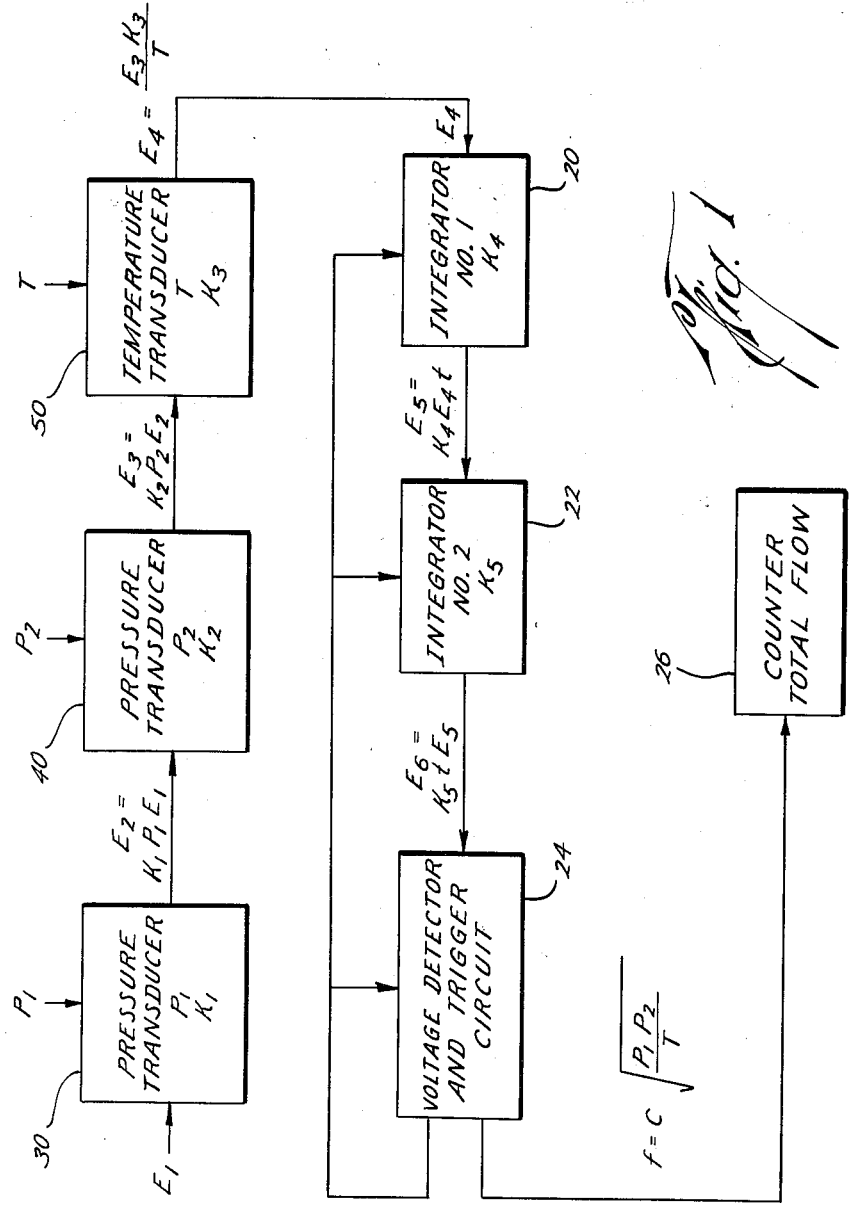

July 2, 1963

J. D. KING 3,096,434

MULTIPLE INTEGRATION FLOW COMPUTER

Filed Nov. 28, 1961

2 Sheets-Sheet 2

James D. King
INVENTOR.

BY James F. Weiler
Jefferson D. Giller
William G. Stout
Paul L. DeVerter II

ATTORNEYS 3,096,434
MULTIPLE INTEGRATION FLOW COMPUTER
James D. King, San Antonio, Tex., assignor, by mesne assignments, to Daniel Orifice Fitting Company, Houston, Tex., a corporation of Texas
Filed Nov. 28, 1961, Ser. No. 155,364
4 Claims. (Cl. 235—151)

The present invention relates to a multiple integration flow computer, and more particularly relates to a multiple integration computer for measuring and computing flow rate and total flow volume.

The present invention will specifically be described as measuring the flow rate and total volume of flow of a fluid through an orifice in which the flow rate is proportional to the square root of the flow variables. However, it is to be understood that the present invention is provided to compute and measure the flow rate and the total quantity of flow of any material wherein the material flow rate is proportional to the $n$th root of one or more of the flow variables. For instance, heat radiation flow could be measured which is proportional to the fourth root of one of its flow variables.

It is therefore a general object of the present invention to provide an improved apparatus for measuring and indicating the flow rate and total volume of material flowing over a specified period of time wherein the flow rate is proportional to the $n$th root of one or more of the flow variables.

By way of example only, the present apparatus may be used in conjunction with an orifice plate in a flowing stream which is used as the primary flow metering element through which the rate of flow is determined by the differential pressure across the orifice, the line pressure, the temperature of the flowing fluid, the orifice characteristics, and the fluid characteristics. These factors are related by the following equation:

$$Q = C\sqrt{\frac{h(\Delta p)}{T}} \quad (1)$$

where Q is the flow rate, C is the orifice, fluid, and measuring units constant, $h$ is the line pressure, $\Delta p$ is the differential pressure across the orifice plate, and T is the fluid temperature.

The total flow, F over a given time period, $t_1$ to $t_2$ is then:

$$F = \int_{t_1}^{t_2} Q\, dt \quad (2)$$

It is an object of the present invention to provide an apparatus to measure the factors of a flow equation and to use measurements to automatically compute and indicate the flow rate and total flow.

A further object of the present invention is the provision of $n$ number of integrators in a flow computer which generates a frequency proportional to the flow rate in which the flow rate is proportional to the $n$th root of one or more of the flow variables.

A still further object of the present invention is the provision of a double integration flow computer which generates a time period of frequency proportional to the flow rate by a double integration of the product of the flow factors of the differential pressure and line pressure divided by the temperature. Thus, a time period or frequency is generated which is proportional to the square root of the input parameters as is necessary for flow rate computation. The total flow is then determined by counting the number of time periods or cycles that occurred during the total time period.

It is yet a further object of the present invention to provide a double integration flow computer by utilizing two series connected integrators having a signal level detector and trigger circuit connected to the output of the second integrator which is periodically actuated when a certain signal level is reached, and having a reset circuit which restores both integrators to zero after the signal level is reached thereby measuring a fixed increment of flow volume.

Yet a still further object of the present invention is the provision of $n$ number of series connected integrators which receive the measuring parameters of flow and upon the measurement of a certain fixed volume of flow periodically actuate a signal level detector and trigger circuit to reset the integrators and actuate a counter to indicate the total volume flow.

Figure 2:
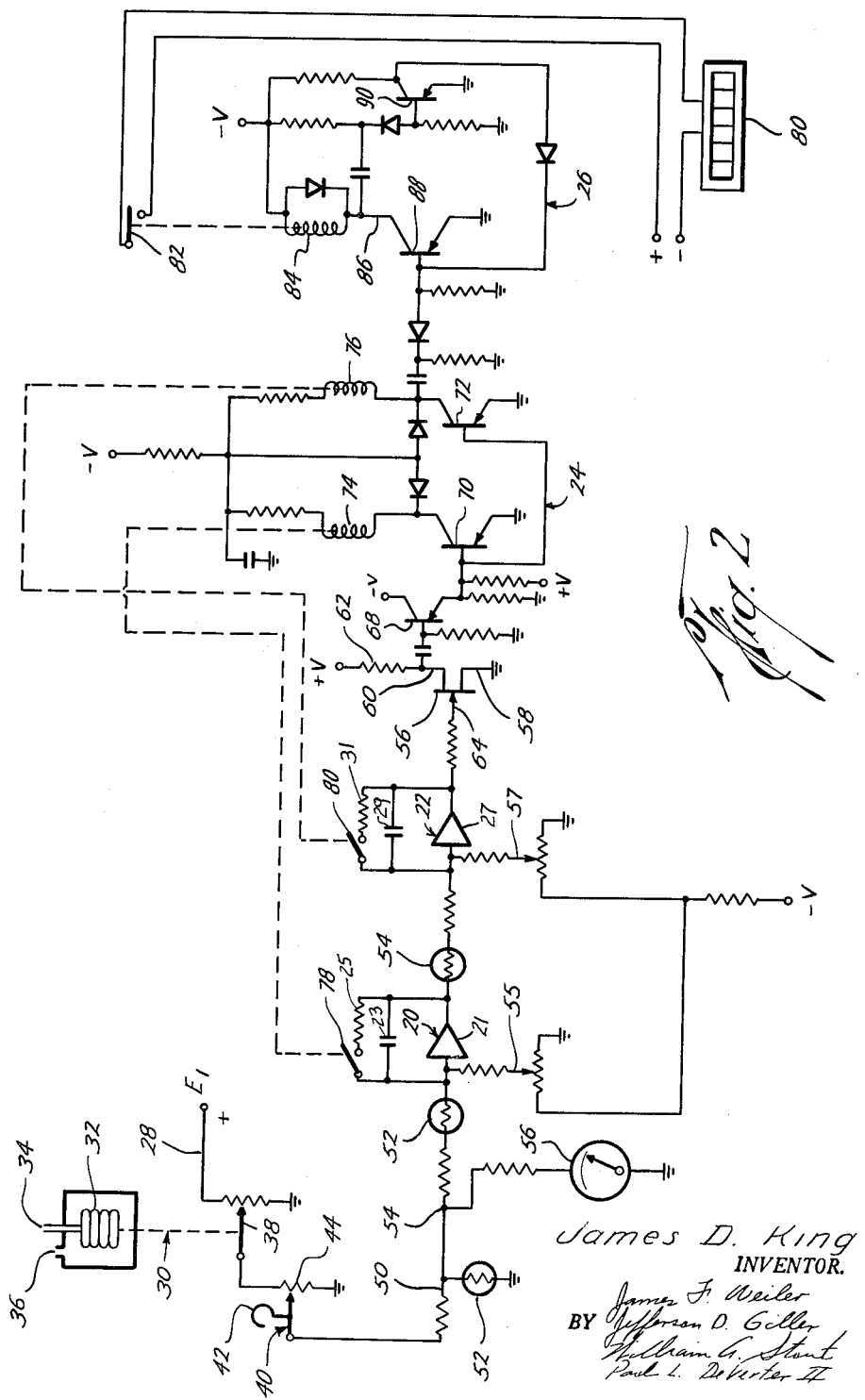

Other and further objects, features and advantages will be apparent from the following description of a presently preferred embodiment of the invention, given for the purpose of disclosure and taken in conjunction with the accompanying drawings, where like character references designate like parts throughout the several views, and where FIGURE 1 is a block diagram, illustrating the present invention in combination with components for measuring and indicating the total volume of fluid that passes through an orifice over a specified period of time, and FIGURE 2 is an electrical schematic of the apparatus illustrated in FIGURE 1.

Referring now to the drawings, and particularly to FIGURE 1, the present invention is specifically directed to a computer circuit for periodically generating a time period or frequency proportional to the square root of an input signal by use of two series connected integrators with a signal level detector and trigger circuit connected to the output of the second integrator and a reset circuit which restores both integrators to zero and actuates a counter.

The input to the first integrator 20 is a voltage $E_4$, as will be more fully described hereinafter which is proportional to the product of the differential pressure, $P_1$, and the line pressure $P_2$, divided by the temperature, T. The output of the first integrator 20, is then:

$$E_5 = k_4 \int_{t_1}^{t_2} E_4\, dt$$

$$E_5 = k_4 E_4 t$$

where $k_4$ is the integrator 20 constant and $$t = t_2 - t_1$$

The output of the first integrator $E_5$ is connected to the input of the second integrator 22 which produces an output voltage $E_6$, where:

$$E_6 = k_5 \int_{t_1}^{t_2} E_5\, dt$$
$$= k_5 k_4 E_4\, dt$$
$$= k_4 k_5 E_4 t^2$$

If the circuit resets itself to zero when $E_6$ is equal to $E_f$, a constant, then:

$$E_f = k_4 k_5 E_4 t^2$$

Therefore, $$t = \sqrt{\frac{E_f}{k_4 k_5 E_4}}$$

Where $t$ is the time for $E_6$ to increase from zero to $E_f$. The time period or repetition frequency, $f$, is then:

$$f = 1/t = \sqrt{\frac{k_4 k_5 E_4}{E_f}}$$

Since $E_f$ is a constant, the above equation may be written $$f = k_6 \sqrt{E_4}$$

But expanding, as will be more fully explained hereinafter, we have:

$$K_6\sqrt{E_4} = C\sqrt{\frac{P_1P_2}{T}}$$

therefore, if $P_1 = \Delta P$ and $P_2 = h$ $$f = C\sqrt{\frac{h(\Delta p)}{T}} \quad (3)$$

Equation 3 is therefore the flow rate equation and therefore the computer double integrator circuit will produce an output time period or frequency, $f$, proportional to the flow rate. Therefore, each period of the frequency $f$ is then a measure of a certain volume of metered fluid and by counting the total number of time periods or frequency periods, $f$, that occur over a certain length of time, the total volume flow, Q, over that length of time will be indicated on a counter 26 as a voltage detector and trigger circuit 24 is designed to be actuated and triggered when $E_6$ becomes a predetermined constant $E_f$, at which time the detector and trigger circuit 24 resets the integrators 20 and 22, trips the counter 26, and restarts the cycle.

Referring now to FIGURE 2, assume, for example only, that the present circuit is used to measure and compute the total volume of fluid passing through an orifice (not shown) over a specified period of time. For convenience and consistency, assume a source of voltage $E_1$ is applied to line 28 and to a pressure transducer generally indicated by the numeral 30, although of course pressure transducer 30 may be of a type that generates an output independent of $E_1$. Pressure transducer 30 measures the differential pressure across the orifice (not shown) and any convenient differential pressure measuring apparatus may be provided such as a bellows 32 which measures the differential pressure between the pressures in lines 34 and 36 (which are connected as is conventional to opposite sides of an orifice) and is mechanically coupled to and actuates a potentiometer 38.

Thus, where $P_1$ is the pressure differential the output from pressure transducer is $E_2$, where $$E_2 = k_1 P_1 E_1$$

where $k_1$ is the transducer 30 constant.

The output from the first transducer 30 is connected to the input of the second pressure transducer 40. Pressure transducer generally indicated by the numeral 40 measures the flow line pressure and may be of any conventional type such as Bourdon tube 42 which is suitably positioned (not shown) to measure the line pressure of the fluid being measured and thus converts the pressure measurement to an electrical signal by mechanically actuating a potentiometer 44. Thus, the output from the second transducer 40 produces an output $E_3$, where $$E_3 = k_2 P_2 E_2$$

where $k_2$ is transducer 40 constant and $P_2$ is the line pressure.

The output from the second pressure transducer 40 is connected to the temperature transducer network generally indicated by the numeral 50 which may include any suitable temperature transducer such as thermister 52 which is suitably and conventionally positioned (not shown) to measure the temperature of the fluid being measured. The output from the temperature transducer network is $E_4$, where, $$E_4 = \frac{E_3 k_3}{T}$$

where $T$ is the temperature of the fluid and $k_3$ is the temperature transducer 50 constant.

The positions of the pressure transducers 30 and 40 and the temperature transducer 50 may be reversed and hooked up in any order desired so long as the type transducers used in the second and third positions in the signal path are of a type that produce an output that is properly proportional to the input signal and the parameter being measured. If the temperature of the fluid being measured is constant, the temperature transducer may be omitted. Similarly, in the case of incompressible materials or fluids, only the differential pressure transducer 30 would be needed and the pressure transducer 40 may be omitted or bypassed.

Thus, the output from the temperature transducer, $E_4$ (FIGURE 1), appears at junction 54 in the circuit of FIGURE 2. At point 54 the signal $E_4$ is proportional to the flow rate squared of the fluid being measured and computed and that flow rate may be indicated on flow meter 56, if desired.

The signal $E_4$ is now applied to the input to the first integrator 20, which is a conventional integrator and generally includes amplifier 21, condenser 23, and resistor 25, and which integrates the signal $E_4$ as a function of time so that where $k_4$ is the integrator 20 constant and during the time period $t$, $$E_5 = k_4 E_4 t$$

A suitable temperature compensating means such as thermister 52 may be provided, if desired, to offset the effect of ambient temperatures on integrator 20.

The output from the integrator 20, $E_5$, is applied to the input of the second integrator 22, which also is a conventional integrator and generally includes amplifier 27, condenser 29, and resistor 31 and which produces an output, $E_6$. Where $k_5$ is the integrator constant over the time interval $t$ and where $$E_6 = k_4 k_5 E_4 t^2$$

A suitable temperature compensating means such as thermister 54 may be provided to offset ambient temperature changes in the integrator 22, if desired.

Conventional adjusting potentiometers 55 and 57 are provided for integrators 20 and 22, respectively, to suitably adjust the integrators.

When the output from the second integrator 22, $E_6$, reaches a predetermined magnitude, $E_f$, the signal level detector and trigger circuit generally indicated by the numeral 24, which is generally a voltage detector and trigger circuit, is actuated at this predetermined magnitude or signal level to reset the integrators 22 and 24 so as to return them to a starting or zero position. Thus, the integration process then starts over and continues repeatedly until $E_6$ again reaches $E_f$.

The signal level detector and trigger circuit 24 may include any suitable type level detector, preferably a voltage level detector and conventional trigger circuit. Referring to FIGURE 2, the level detector shown to detect the fact that the output voltage, $E_6$, has reached a selected level, $E_f$, is a unijunction transistor. The transistor 56 has two base leads and one emitter lead and is connected so that one base lead 58 is grounded and the second base lead 60 is connected through a resistor 62 to a source of positive potential. The emitter lead 64 is connected to the circuit to be monitored, that is, the output of integrator 22, $E_6$. With less than the positive potential $E_f$ between the emitter and base 58, a high resistance exists between the two base leads, but as the emitter potential reaches a positive potential equal to $E_f$, the resistance between the base lead 58 and the emitter becomes much smaller. The voltage drop across the resistor 62 in series with base 60 increases when the emitter potential reaches $E_f$ and this voltage change is used to actuate a conventional trigger circuit which includes transistors 68, 70 and 72, all of which is conventional and no further description is believed necessary. The triggering circuit in turn actuates relays 74 and 76. Relays 74 and 76 are mechanically connected to reset switches 78 and 80 which are connected to the integrators 20 and 22, respectively. Thus, each time that output voltage $E_6$ from integrator 22 reaches a predetermined level, $E_f$, the signal level detector and trigger circuit 24 is actuated to reset the integrators 20 and 22 to zero so that the integration process then starts over and continues again until the output signal $E_6$ again reaches $E_f$.

But the time period, $t$, required for the magnitude of $E_6$ to change from the starting value to $E_f$ is then $$t^2 = \frac{E_f}{k_4 k_5 E_4}$$

$$t = \left[\frac{E_f}{k_4 k_5 E_4}\right]^{1/2}$$

The output from the trigger circuit can be considered as a frequency, $f$.

$$f = \frac{1}{t} = \left[\frac{k_4 k_5 E_4}{E_f}\right]^{1/2} \tag{4}$$

Expanding 4 to include the previously defined variables $$f = \left[\frac{k_1 k_2 k_3 k_4 k_5 P_1 P_2 E_1}{E_f T}\right]^{1/2}$$

or $$f = \left[\frac{k_1 k_2 k_3 k_4 k_5 P_1 P_2}{E_f T}\right]^{1/2}$$

Let $$\left[\frac{k_1 k_2 k_3 k_4 k_5 E_1}{E_f}\right]^{1/2} = C$$

or $$\left[\frac{k_1 k_2 k_3 k_4 k_5}{E_f}\right]^{1/2} = C$$

Then $$f = C\sqrt{\frac{P_1 P_2}{T}}$$

which is the same as Equation 1 if $$F = Q$$
$$P_1 = \Delta p$$
$$P_2 = h$$

Therefore, for each time period of the frequency $f$, a measure of a certain fixed volume of fluid is measured. Thus, each time the output voltage $E_6$ reaches a level of $E_f$, the integrating circuits 20 and 22 are reset to again calculate and integrate up to the predetermined value of the voltage $E_6$, which is the measure of a certain fixed volume of fluid. The frequency is thus proportional to the flow rate.

Since each time the voltage detector and trigger circuit 24 is actuated, a certain volume of fluid is metered, a suitable counter 26 (FIGURE 1) may be connected to the detector in trigger circuit 24 so as to total up the measured volumes of fluid to give the total flow volume which has been measured and computed.

Referring now to FIGURE 2, the counter generally indicated by the numeral 26 may be any conventional counter and may include mechanical counter 80 which is actuated when the switch 82 is closed. The switch 82 is in turn actuated by a relay 84 which is in turn driven by a conventional transistorized one shot multivibrator circuit 86 which includes transistors 88 and 90. The multivibrator circuit 86 is connected to and is actuated by the detector and trigger circuit 24.

Thus, the double integrating computer circuit of the present invention will produce an output signal at a frequency proportional to the flow rate and thus will simply automatically measure and compute the total volume flow of a fluid. The series integrators 20 and 22 provides a computer based upon the generation of a signal at a frequency proportional to the flow rate by a double integration technique on the electrical product of the differential pressure and line pressure divided by the temperature. The double integrators provide the generation of a signal at a frequency proportional to the square root of the input parameters as is necessary for flow rate computation. The total flow is determined by counting the number of cycles of the flow rate frequencies that occur during the total flow time period.

In operation, the present invention is shown adapted to work with an orifice plate (not shown) in a flowing stream as the primary metering element through which the rate of flow is determined by the differential pressure, $P_1$, across the orifice, the line pressure, $P_2$, and the temperature of the flowing fluid, T. Thus, a suitable differential pressure transducer 30 would be conventionally connected with lines 34 and 36 communicating on opposite sides of an orifice plate (not shown) to measure the differential pressure $P_1$. A second transducer 40, such as a Bourdon tube 42 would be conventionally connected to measure the line pressure, $P_2$, of the fluid and a suitable temperature transducer network 50 such as a thermister would be positioned to measure the temperature, T, of the flowing fluid. Therefore, assuming an electrical input signal of $E_1$ to the pressure transducer 30 at line 28 the pressures acting through the line 34 and 36 would provide a differential pressure which would act upon the bellows 32 which is mechanically coupled to a potentiometer 38 to produce an output signal, $E_2$, where, $$E_2 = k_1 P_1 E_1$$

The output of the first transducer 30 is connected to the input of the second transducer 40 whereupon the line pressure, $P_2$, affects the Bourdon tube 42 which is mechanically coupled to the potentiometer 44 to produce an output $E_3$, where $$E_3 = k_2 P_2 E_2$$

The output of the second transducer 40, $E_3$, is connected to the temperature transducer network 50 whereupon the temperature, T, of the fluid affects the thermister 52 so as to produce an output $E_4$, where $$E_4 = \frac{E_3 k_3}{T}$$

Thus the input to the computer section, $E_4$, may be taken off of the point 54 (FIGURE 2) and represents the square of the flow rate of the fluid and may be read on the flow rate meter 56.

Thus, the input $E_4$ to the first integrator 20 is a voltage proportional to the product of the differential pressure, $P_1$, and the line pressure, $P_2$ divided by the temperature, T. The output of the first integrator 20 is then:

$$E_5 = k_4 \int_{t_1}^{t_2} E_4 dt$$

$$E_5 = k_4 E_4 t$$

The output of the first integrator 20, $E_5$, is connected to the input of the second integrator 22 which produces an output voltage, $E_6$, where $$E_6 = k_5 \int_{t_1}^{t_2} E_5 dt$$

$$E_6 = k_4 k_5 E_4 t^2$$

The output signal E is applied to the input to the voltage detector and trigger circuit 24. However, when $E_6$ reaches a predetermined magnitude, $E_f$, the voltage detector and trigger circuit resets the integrator 20 and 22 to zero and therefore $$t = \sqrt{\frac{E_f}{k_4 k_5 E_4}}$$

Since $E_f$ is a constant, the equation may be rewritten as $$f = \frac{1}{t} = \sqrt{\frac{k_4 k_5 E_4}{E_f}}$$

and as previously discussed $$f = C\sqrt{\frac{P_1 P_2}{T}} = C\sqrt{\frac{h(\Delta p)}{T}} = Q$$

Therefore, the output frequency, $f$, is proportional to flow rate and each period of the frequency $f$ is a measure of a certain fixed volume of fluid. By counting the total number of cycles that occur over a time period, the total volume flow over that period may be indicated on the counter.

As best seen in FIGURE 2, the level detector and trigger circuit 24 detects the fact that the output voltage $E_6$ has reached the selected level, $E_f$ by the transistor 64. With less than a positive potential $E_f$ between the emitter 56 and base 58, a high resistance exists between the two base leads, but as the emitter potential reaches a positive potential equal to $E_f$, the resistance between the base leads becomes much smaller. Thus, the voltage drop across resistor 62 increases when the emitter potential reaches $E_f$ and this voltage change is used to actuate a conventional trigger circuit consisting of the transistor 68 to create a trigger pulse which is amplified by the transistors 70 and 72 to actuate the reset relays 74 and 76, respectively, thereby closing the reset switches 78 and 80, of the integrators 20 and 22, respectively. Thus, each time the output $E_6$ equals a certain constant, $E_f$, the voltage detector and trigger circuit 24 resets the integrators 20 and 22 to zero as a certain volume of fluid has then been metered and computed.

Also, when the detector and trigger circuit 24 is actuated to reset the integrators, the circuit 24 also actuates a conventional transistorized one shot multivibrator circuit which includes transistors 88 and 90 to actuate a counter relay 84. When the counter relay 84 is actuated the switch 82 closes allowing a pulse of electricity to actuate the counter 80 to indicate the metering of a unit volume of fluid.

Thus, the above described double integration flow computer while shown measuring and computing the flow of fluid through an orifice by way of example only, is capable of measuring and computing the volume flow of any material wherein the flow rate is proportional to the square root of the input parameters of the flow rate computation. And, of course, $n$ number of series connected integrators may be provided in a flow computer which is capable of measuring the volume flow and which generates a frequency proportional to the flow rate wherein the flow rate is proportional to the $n$th root of at least one of the flow variables.

The present invention, therefore, is well adapted to carry out the objects and attain the ends and advantages mentioned as well as others inherent therein. While a presently preferred embodiment of the invention is given for the purpose of disclosure, numerous changes in the details of construction and arrangement of parts may be made which will readily suggest themselves to those skilled in the art and which are encompassed within the spirit of the invention and the scope of the appended claims.

What is claimed is:

1. A double integration flow meter for measuring the volume of a flowing fluid wherein the flow rate is proportional to the square root of the flow pressure of the fluid, the differential pressure drop across an orifice and inversely proportional to the square root of the temperature of the fluid comprising,
    (a) a differential pressure transducer,
    (b) a pressure drop transducer,
    (c) a temperature transducer,
    (d) a first integrator for receiving measurements from all of said transducers,
    (e) a second integrator connected to the output of the first integrator and integrating said output,
    (f) a signal level detector and trigger circuit connected to the output of the second integrator,
    (g) a resetting circuit connected to said detector and trigger circuit and to said first and second integrators,
    (h) said detector and trigger circuit being actuated on a predetermined output of the second integrator thereby actuating said resetting circuit and resetting the integrators, and
    (i) a counter connected to the detector and trigger circuit and actuated by said circuit to measure total volume flow.

2. In a flow measurement circuit for measuring the flow rate which is proportional to the $n$th root of at least one of the flow variables, the improvement comprising,
    an $n$ number of integrators connected in series, the first of said integrators adapted to receive a measurement of said one flow variable which is proportional to the $n$th root,
    a signal level detector circuit connected to the output of the last of the series connected integrators, said detector circuit being actuated each time when the output signal from the last integrator reaches a fixed predetermined level thereby providing a detector output frequency which measures a fixed volume of flowing material each time it is actuated,
    an integrator resetting circuit connected to said detector circuit and to each of said integrators, said resetting circuit resetting all of said integrators when actuated by the detector circuit so as to repeat the cycle of measuring a fixed volume of material flow, and
    a counter connected to and actuated by the output from the detector circuit thereby measuring the number of times the detector circuit is actuated and thereby measuring the total volume flow of said material.

3. A double integration flow meter for measuring the volume of a flowing material comprising,
    a first integrator for receiving measurements of the variable factors determining material flow,
    a second integrator connected to the first integrator for integrating the output of the first integrator,
    a signal level detecting circuit means connected to the output of the second integrator, said detector circuit means being actuated each time the output from the second integrator reaches a constant predetermined level thereby being actuated each time the integrators measure a predetermined volume of material flow,
    a resetting circuit means connected to said detector circuit and the first and second integrators, said resetting circuit resetting the first and second integrators each time the detector circuit is actuated by the output signal from the second integrator thereby placing the integrators in position to measuring another predetermined volume of fluid flow,
    a counter connected to the signal level detector means for measuring the number of times the detector circuit is actuated thereby adding and indicating the total volume flow.

4. A computer circuit for measuring the volume of a material wherein the flow rate is proportional to the square root of the flow variables comprising,
    a first integrator for receiving measurements of the flow variables,
    a second integrator connected to the first integrator and integrating the output of said first integrator whereby the output of the second integrator is proportional to the flow rate,
    a voltage level detector circuit connected to output of the second integrator, said detector circuit being actuated each time the voltage level of the second integrator reaches a fixed predetermined level thereby measuring a fixed volume of fluid,
    an integrator resetting circuit connected to and actuated by said voltage level detector and connected to said first and second detectors for resetting the detectors upon actuation thereby recycling the integrators for measuring another fixed volume of material, and
a counter connected to the voltage detector for counting the number of times that said voltage detector circuit is actuated thereby totalizing the volume flow of said material.

References Cited in the file of this patent
UNITED STATES PATENTS
3,016,197    Newbold _____ Jan. 9, 1962